United States Patent
Geng et al.

(10) Patent No.: US 11,834,577 B2
(45) Date of Patent: Dec. 5, 2023

(54) POLYCARBONATE COMPOSITION AND ASSOCIATED ARTICLE AND METHOD OF ADDITIVE MANUFACTURING

(71) Applicant: SHPP Global Technologies B.V., Bergen op Zoom (NL)

(72) Inventors: Eddie Kebin Geng, Exton, PA (US); Rabeh Elleithy, Pittsfield, MA (US); Timothy Allessio, Pittsfield, MA (US); Peter Vollenberg, Mt. Vernon, IN (US); Walter R. Thompson, Exton, PA (US); David Voorde, Pittsfield, MA (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 240 days.

(21) Appl. No.: 17/280,244

(22) PCT Filed: Apr. 25, 2019

(86) PCT No.: PCT/US2019/029068
§ 371 (c)(1),
(2) Date: Mar. 26, 2021

(87) PCT Pub. No.: WO2020/068164
PCT Pub. Date: Apr. 2, 2020

(65) Prior Publication Data
US 2022/0049089 A1 Feb. 17, 2022

(30) Foreign Application Priority Data
Sep. 26, 2018 (EP) .................... 18196849

(51) Int. Cl.
| | |
|---|---|
| C08L 69/00 | (2006.01) |
| C08K 7/06 | (2006.01) |
| B29C 64/165 | (2017.01) |
| C08G 64/12 | (2006.01) |
| B33Y 80/00 | (2015.01) |
| B33Y 70/10 | (2020.01) |
| C08K 7/02 | (2006.01) |

(52) U.S. Cl.
CPC .......... *C08L 69/00* (2013.01); *B29C 64/165* (2017.08); *C08G 64/12* (2013.01); *C08K 7/06* (2013.01); *B33Y 70/10* (2020.01); *B33Y 80/00* (2014.12); *C08K 7/02* (2013.01); *C08K 2201/003* (2013.01); *C08L 2201/08* (2013.01); *C08L 2205/02* (2013.01)

(58) Field of Classification Search
None
See application file for complete search history.

(56) References Cited

U.S. PATENT DOCUMENTS

| | | |
|---|---|---|
| 5,196,479 A | 3/1993 | Laughner et al. |
| 5,344,910 A | 9/1994 | Sybert |
| 9,120,893 B1 | 9/2015 | Chandra et al. |
| 9,808,991 B2 | 11/2017 | Tyler |
| 9,925,714 B2 | 3/2018 | Rodgers et al. |
| 2007/0010619 A1* | 1/2007 | Chatterjee ............... C08L 69/00 528/196 |
| 2007/0123688 A1* | 5/2007 | Mahood ................. C08G 64/28 528/196 |
| 2009/0088504 A1* | 4/2009 | Chatterjee ............... C08L 69/00 524/158 |
| 2011/0060106 A1* | 3/2011 | de Kraker ............... C08L 69/00 525/461 |

(Continued)

FOREIGN PATENT DOCUMENTS

| | | |
|---|---|---|
| CN | 105440450 A | 3/2016 |
| CN | 105440560 A | 3/2016 |

(Continued)

OTHER PUBLICATIONS

LEXAN 105 product data sheet (2018). (Year: 2018).*
LEXAN Copolymer XHT3141 (2017). (Year: 2017).*
European Food Safety Journal 2012;10(7):2825 pp. 1-9. (Year: 2012).*
International Search Report dated Sep. 6, 2019; International Application No. PCT/US2019/029068; International Filing Date Apr. 25, 2019 (5 pgs).
Written Opinion dated Sep. 6, 2019; International Application No. PCT/US2019/029068; International Filing Date Apr. 25, 2019 (11 pgs).
Covestro Apec 2097 ISO Data Sheet, Edition Feb. 8, 2019 (3 pages).

*Primary Examiner* — David J Buttner
(74) *Attorney, Agent, or Firm* — CANTOR COLBURN LLP

(57) ABSTRACT

A composition includes specific amounts of a reinforcing filler and a copolycarbonate containing bisphenol A carbonate units and second carbonate units of the formula wherein $R^a$, $R^b$, $R^3$, $R^4$, j, p, and q are defined herein. The composition is useful for fabricating articles that exhibit a desirable balance of heat resistance, printability in large format additive manufacturing, and good surface appearance in printed parts. Also described is a method of additive manufacturing utilizing the composition.

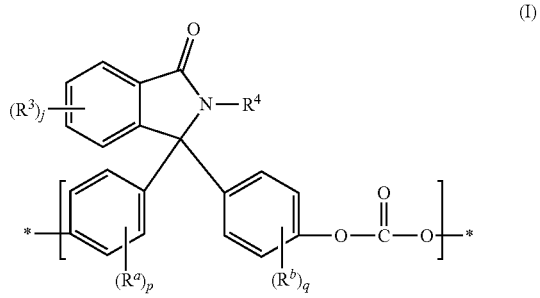

3 Claims, 3 Drawing Sheets

(56) References Cited

U.S. PATENT DOCUMENTS

| | | | |
|---|---|---|---|
| 2012/0202034 A1* | 8/2012 | Morizur | C08L 69/00 524/165 |
| 2014/0061974 A1 | 3/2014 | Tyler | |
| 2014/0234629 A1* | 8/2014 | Sun | C08L 69/005 524/165 |
| 2015/0145168 A1 | 5/2015 | Rodgers et al. | |
| 2015/0183159 A1 | 7/2015 | Duty et al. | |
| 2017/0144368 A1 | 5/2017 | Bihari et al. | |
| 2017/0266887 A1 | 9/2017 | Roviaro et al. | |
| 2019/0010327 A1 | 1/2019 | Gallucci et al. | |
| 2019/0366621 A1* | 12/2019 | Achten | B33Y 70/10 |
| 2020/0189180 A1 | 6/2020 | Bihari et al. | |
| 2021/0238411 A1* | 8/2021 | Moniruzzaman | C08L 69/00 |

FOREIGN PATENT DOCUMENTS

| | | | |
|---|---|---|---|
| JP | 58215448 | * | 12/1983 |
| JP | 04008759 | * | 1/1992 |
| JP | 06128474 | * | 5/1994 |
| WO | 2015048735 A1 | | 4/2015 |
| WO | 2015195527 A1 | | 12/2015 |
| WO | 2017100447 A1 | | 6/2017 |
| WO | 2017100449 A1 | | 6/2017 |
| WO | 2017100451 A1 | | 6/2017 |
| WO | 2017100494 A1 | | 6/2017 |
| WO | 2017191150 A1 | | 11/2017 |
| WO | 2019089887 A1 | | 5/2019 |
| WO | 2020102531 A1 | | 5/2020 |

* cited by examiner

POLYCARBONATE COMPOSITION AND ASSOCIATED ARTICLE AND METHOD OF ADDITIVE MANUFACTURING

CROSS-REFERENCE TO RELATED APPLICATIONS

This application is a National Stage application of PCT/US2019/029068, filed Apr. 25, 2019, which claims the benefit of European Patent Application No. 18196849.6, filed Sep. 26, 2018, both of which are incorporated by reference herein in their entirety.

BACKGROUND OF THE INVENTION

Compared to conventional metal molds made by computer numeric control machine or other mechanical process, reinforced polymeric composite molds made by additive manufacturing have advantages including design flexibility, shorter fabrication times, and much lower cost. Additive manufacturing is therefore increasingly used to fabricate tooling and molds for prototyping purposes. Polycarbonate derived from bisphenol A is frequently used for additive manufacturing. However, additively manufactured parts made using bisphenol A polycarbonate can have insufficient heat resistance for applications requiring exposure to elevated temperatures, such as when the parts are exposed to a typical autoclave process with a temperature of about 121° C. (250° F.) and a pressure of about 207 kilopascals (30 pounds per square inch). Plastics with substantially greater heat resistance, such as polyethersulfones and polyetherimides, can be used for additive manufacturing, but they are substantially more expensive than polycarbonates, can be challenging to print using additive manufacturing equipment, and may not provide the desired surface appearance. Thus, there is a need for polymeric compositions that exhibit an improved balance of heat resistance, printability in large format additive manufacturing, and good surface appearance in printed parts.

BRIEF SUMMARY OF EMBODIMENTS OF THE INVENTION

One embodiment is a composition, comprising, based on the weight of the composition: 40 to 99 weight percent of a copolycarbonate comprising, based on 100 mole percent total carbonate units, 40 to 90 mole percent bisphenol A carbonate units and 10 to 60 mole percent of second carbonate units of the formula

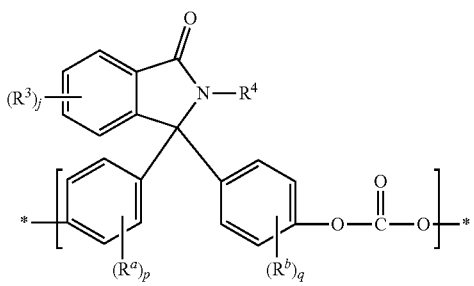

wherein $R^a$ and $R^b$ are independently at each occurrence $C_1$-$C_{12}$ alkyl, $C_2$-$C_{12}$ alkenyl, or $C_1$-$C_{12}$ alkoxyl; $R^3$ is independently at each occurrence $C_1$-$C_{12}$ alkyl; $R^4$ is hydrogen, $C_2$-$C_6$ alkyl, or phenyl optionally substituted with 1, 2, 3, 4, or 5 $C_1$-$C_6$ alkyl groups; and p, q, and j are each independently 0, 1, 2, 3, or 4; and 1 to 60 weight percent of a reinforcing filler selected from the group consisting of carbon fiber, graphene platelets, aromatic polyamide fibers, aromatic polyester fibers, ultra-high molecular weight polyethylene fibers, and combinations thereof.

Another embodiment is an article comprising the composition in any of its variations.

Another embodiment is a method of additive manufacturing, the method comprising: melt extruding the composition in any of its variations to form a first molten extrusion; depositing the first molten extrusion in a predetermined pattern to form a first layer comprising an upper surface; further melt extruding the same composition to form a second molten extrusion; and depositing the second molten extrusion in a predetermined pattern to form a second layer comprising a lower surface in contact with the upper surface of the first layer.

These and other embodiments are described in detail below.

DETAILED DESCRIPTION OF THE INVENTION

Figure 1:
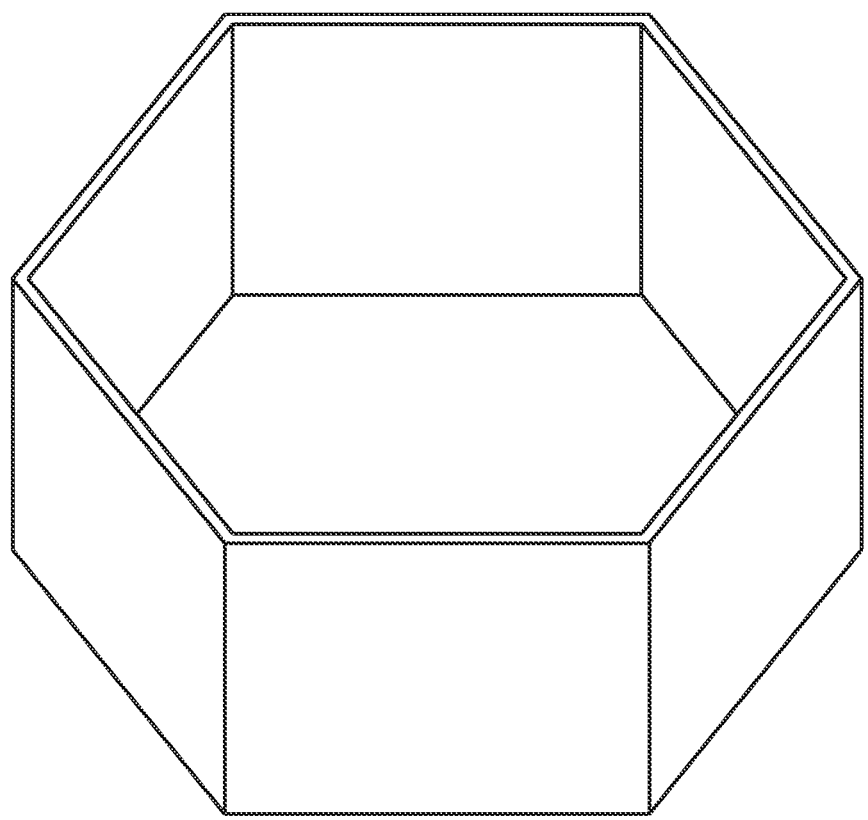
FIG. 1 is an image of a six-sided object printed by large format additive manufacturing.

The present inventors have determined that an improved balance of heat resistance, printability in large format additive manufacturing, and good surface appearance in printed parts is provided by a composition, comprising, based on the weight of the composition: 40 to 99 weight percent of a copolycarbonate comprising, based on 100 mole percent total carbonate units, 40 to 90 mole percent bisphenol A carbonate units and 10 to 60 mole percent of second carbonate units of the formula

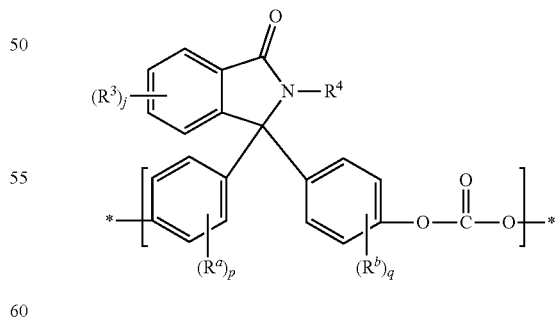

wherein $R^a$ and $R^b$ are independently at each occurrence $C_1$-$C_{12}$ alkyl, $C_2$-$C_{12}$ alkenyl, or $C_1$-$C_{12}$ alkoxyl; $R^3$ is independently at each occurrence $C_1$-$C_{12}$ alkyl; $R^4$ is hydrogen, $C_2$-$C_6$ alkyl, or phenyl optionally substituted with 1, 2, 3, 4, or 5 $C_1$-$C_6$ alkyl groups; and p, q, and j are each independently 0, 1, 2, 3, or 4; and 1 to 60 weight percent of a reinforcing filler selected from the group consisting of carbon fiber, graphene platelets, aromatic polyamide fibers, aromatic polyester fibers, ultra-high molecular weight polyethylene fibers, and combinations thereof. As used herein, the term "alkyl" includes linear, branched, cyclic, and polycyclic alkyl groups, as well as alkyl groups having a combination of at least two types of linear, branched, cyclic, and polycyclic alkyl fragments.

The composition comprises a copolycarbonate comprising bisphenol A carbonate units and carbonate units derived from an unsubstituted or substituted 3,3-bis(4-hydroxyphenyl)isoindolin-1-one. Bisphenol A carbonate units have the structure

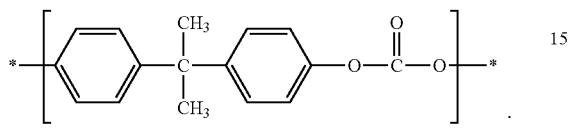

The carbonate units derived from the unsubstituted or substituted 3,3-bis(4-hydroxyphenyl)isoindolin-1-one are of the formula

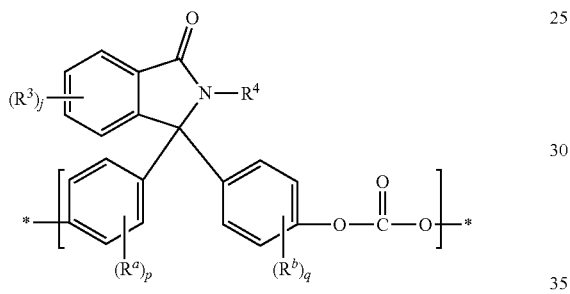

wherein $R^a$ and $R^b$ are independently at each occurrence $C_1$-$C_{12}$ alkyl, $C_2$-$C_{12}$ alkenyl, or $C_1$-$C_{12}$ alkoxyl; $R^3$ is independently at each occurrence $C_1$-$C_{12}$ alkyl; $R^4$ is hydrogen, $C_2$-$C_6$ alkyl, or phenyl optionally substituted with 1, 2, 3, 4, or 5 $C_1$-$C_6$ alkyl groups; and p, q, and j are each independently 0, 1, 2, 3, or 4. In some embodiments. $R^a$ and $R^b$ are each the same and are each a $C_{1-3}$ alkyl; each $R^3$ is independently the same $C_{1-3}$ alkyl; $R^4$ is $C_2$-$C_6$ alkyl or phenyl; j is 0 or 1; and p and q are each independently 0 or 1. In some embodiments, $R^4$ is phenyl. In some embodiments, p, q, and j are each zero. In some embodiments, $R^4$ is phenyl and p, q, and j are each zero.

The copolycarbonate comprises 40 to 90 mole percent of the bisphenol A carbonate units and 10 to 60 mole percent of the second carbonate units, based on 100 mole percent total carbonate units in the copolycarbonate. Within the range of 40 to 90 mole percent, the content of bisphenol A carbonate units can be 45 to 90 mole percent, or 50 to 85 mole percent, 60 to 80 mole percent, or 60 to 75 mole percent. Within the range of 10 to 60 mole percent, the content of second carbonate units can be 10 to 55 mole percent, or 15 to 50 mole percent, 20 to 40 mole percent, or 30 to 40 mole percent.

In some embodiments, the copolycarbonate further includes, based on 100 mole percent total carbonate units in the copolycarbonate, 1 to 40 mole percent of third carbonate units different from bisphenol A carbonate units and second carbonate units, based on the sum of the moles of the bisphenol A carbonate units, second carbonate units, and third carbonate units. The third carbonate units can have the formula

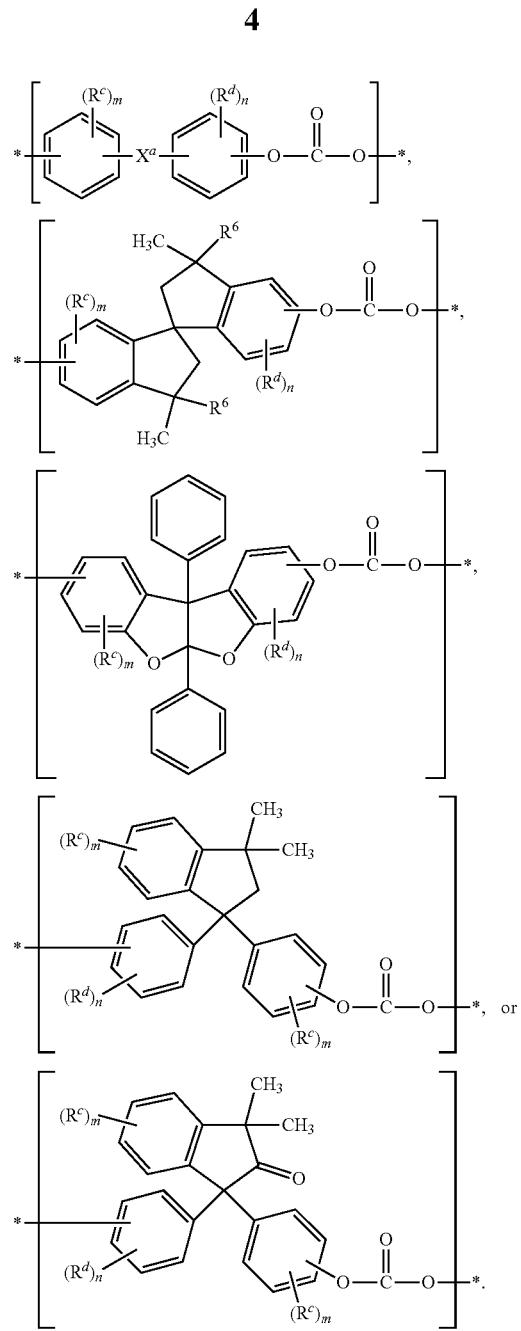

or a combination thereof, wherein $R^c$ and $R^d$ are independently at each occurrence $C_1$-$C_{12}$ alkyl, $C_2$-$C_{12}$ alkenyl, or $C_1$-$C_{12}$ alkoxyl; $R^6$ is independently at each occurrence $C_1$-$C_3$ alkyl or phenyl, preferably methyl; $X^a$ is independently at each occurrence $C_6$-$C_{12}$ polycyclic arylene. $C_3$-$C_{18}$ mono- or polycycloalkylene, $C_3$-$C_{18}$ mono- or polycycloalkylidene. —$C(P^1)(P^2)$— wherein $P^1$ is $C_1$-$C_{12}$ alkyl and $P^2$ is a $C_6$-$C_{12}$ aryl, or -$(Q^1)_x$-G-$(Q^2)_y$— wherein $Q^1$ and $Q^2$ are independently at each occurrence $C_1$-$C_3$ alkylene, G is independently at each occurrence $C_3$-$C_{10}$ cycloalkylene, x is 0 or 1, and y is 1; and m and n are independently at each occurrence 0, 1, 2, 3, or 4.

Exemplary third carbonate units include the following

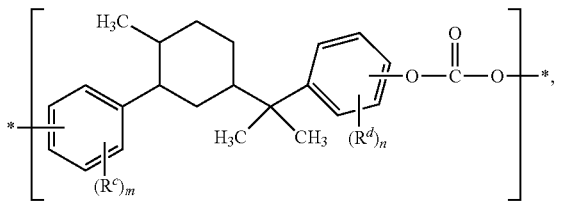
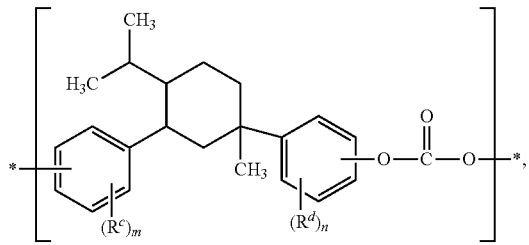
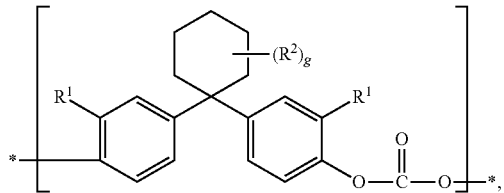
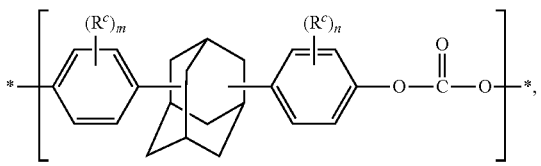
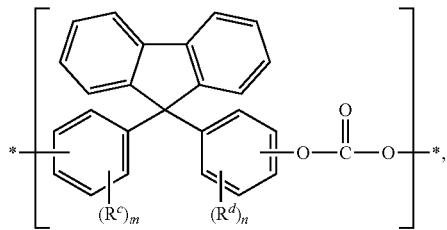
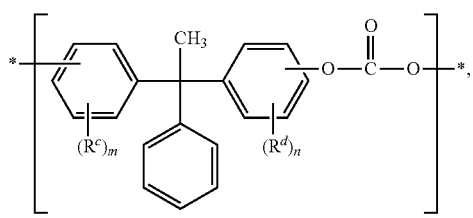
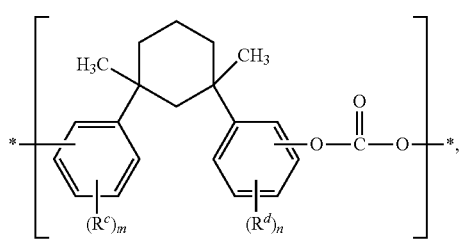
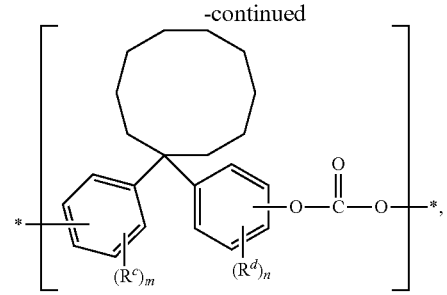
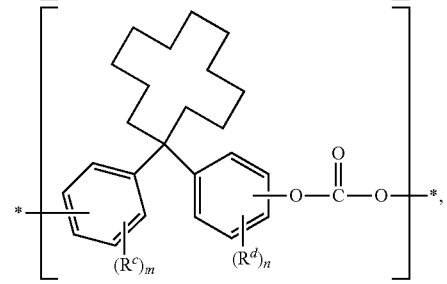
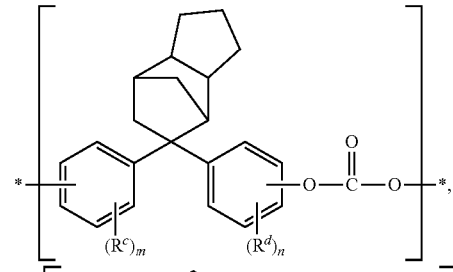
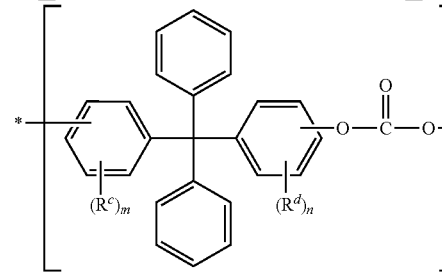

and combinations thereof, wherein $R^c$ and $R^d$ are defined as above; $R^1$ is independently at each occurrence hydrogen or $C_1$-$C_4$ alkyl; $R^2$ is independently at each occurrence $C_1$-$C_4$ alkyl; and g is independently at each occurrence 0, 1, 2, 3, 4, 5, 6, 7, 8, 9, or 10. In some embodiments, $R^1$ and $R^2$ are indecently at each occurrence hydrogen or methyl; g is indecently at each occurrence 0, 1, or 2; and m and n are 0. In some embodiments the third carbonate units are 1,1-bis(4-hydroxyphenyl)-3,3,5-trimethylcyclohexane carbonate units, 1,1-bis(4-hydroxy-3-methylphenyl)cyclohexane carbonate units, or a combination thereof. In some embodiments, the third carbonate units are 1,1-bis(4-hydroxyphenyl)-3,3,5-trimethyl-cyclohexane (BPA TMC) carbonate units.

When the third carbonate units are present, the copolycarbonate can comprise 15 to 70 mole percent of the bisphenol A carbonate units, 5 to 50 mole percent of the second carbonate units, and 5 to 50 mole percent of the third carbonate units, each based on 100 mole percent total carbonate units in the copolycarbonate. In some embodiments, the copolycarbonate comprises 30 to 60 mole percent of the bisphenol A carbonate units, 5 to 35 mole percent of the second carbonate units, 5 to 35 mole percent of the third carbonate units, each based on 100 mole percent total carbonate units in the copolycarbonate.

In some embodiments, the copolycarbonate is a highly random copolymer in which less than 15 mole percent (or less than 10 mole percent) of the second carbonate units are directly coupled to another second carbonate unit based on the total number of second carbonate units in the copolycarbonate. The mole percent of directly coupled second carbonate units can be determined by nuclear magnetic resonance spectroscopy (NMR).

In some embodiments, the copolycarbonate has a weight average molecular weight of 10,000 to 50,000 grams/mole, or 16,000 to 35,000 grams/mole, or 27,000 to 33,000 grams/mole, each as determined by gel permeation chromatography (GPC), using a crosslinked styrene-divinylbenzene column and calibrated to bisphenol A-based polycarbonate standards. GPC samples are prepared at a concentration of 1 milligram per milliliter, and are eluted at a flow rate of 1.5 milliliter per minute.

The copolycarbonate can have a high glass transition temperature ($T_g$). In some embodiments, the glass transition temperature is in the range 155 to 280° C. or 165 to 260° C. or 185 to 230° C., each as determined by differential scanning calorimetry (DSC) according to ASTM D3418-15 at a heating rate of 20° C./minute under nitrogen.

The copolycarbonate can be prepared by methods known in the art, including those described in U.S. Pat. No. 5,344,910 to Sybert, issued 6 Sep. 1994; International Patent Application Publication No. WO 2015/048735 A1 of Mahood et al., published 2 Apr. 2015; and International Patent Application Publication No. WO 2017/191150 A1 of Hungerland et al., published 9 Nov. 2017. An end-capping agent (also referred to as a chain stopping agent or chain terminating agent) can be included during polymerization to provide end groups. Examples of end-capping agents include monocyclic phenols such as phenol, p-cyanophenol, and $C_1$-$C_{22}$ alkyl-substituted phenols such as p-cumylphenol, resorcinol monobenzoate, and p-tertiary-butylphenol; monoethers of diphenols, such as p-methoxyphenol; monoesters of diphenols such as resorcinol monobenzoate; functionalized chlorides of aliphatic monocarboxylic acids such as acryloyl chloride and methacryoyl chloride; and mono-chloroformates such as phenyl chloroformate, alkyl-substituted phenyl chloroformates, p-cumylphenyl chloroformate, and toluene chloroformate. Combinations of different end groups can be used.

The composition comprises the copolycarbonate in an amount of 40 to 99 weight percent, based on the total weight of the composition. Within this range, the copolycarbonate content can be 35 to 95 weight percent, or 40 to 90 weight percent, or 50 to 90 weight percent, or 60 to 90 weight percent, or 70 to 90 weight percent, or 75 to 85 weight percent.

In addition to the copolycarbonate, the composition comprises a reinforcing filler. The reinforcing filler is selected from the group consisting of carbon fiber, graphene platelets, aromatic polyamide fibers (including poly(p-phenylene terephthalamide) fibers), aromatic polyester fibers (including fibers comprising a liquid crystal copolymer produced by polycondensation of 4-hydroxybenzoic acid and 6-hydroxynaphthalene-2-carboxylic acid), ultra-high molecular weight polyethylene fibers (including fibers in which the polyethylene weight average molecular weight is 3,000,000 to 8,000,000 grams/mole), and combinations thereof. In some embodiments, the reinforcing filler has a pre-compounded aspect ratio of 10:1 to 10,000:1. Within this range, the aspect ratio can be 20:1 to 5.000:1, or 50:1 to 2.000:1.

In some embodiments, the reinforcing filler is reinforcing fiber having a diameter of 10 nanometers to 100 micrometers. Reinforcing fiber includes carbon fiber, aromatic polyamide fibers (including poly(p-phenylene terephthalamide) fibers), aromatic polyester fibers (including fibers comprising a liquid crystal copolymer produced by polycondensation of 4-hydroxybenzoic acid and 6-hydroxynaphthalene-2-carboxylic acid), ultra-high molecular weight polyethylene fibers (including fibers in which the polyethylene weight average molecular weight is 3,000,000 to 8,000,000 grams/mole), and combinations thereof. Within the range of 10 nanometers to 100 micrometers, the reinforcing fiber diameter can be 20 nanometers to 50 micrometers, or 50 nanometers to 25 micrometers, or 100 nanometers to 15 micrometers. The reinforcing filler can, optionally, comprise a surface treatment for compatibility with the remainder of the composition. Such surface treatments are known in the art, and surface-treated reinforcing fillers are commercially available.

In some embodiments, the reinforcing filler is carbon fiber. In these embodiments, the carbon fiber can, optionally, have a diameter of 4 to 100 micrometers. Within this range, the diameter can be 5 to 50 micrometers, or 5 to 25 micrometers, or 5 to 15 micrometers. Also in these embodiments, the carbon fiber can, optionally, have a pre-compounded length of 4 to 50 millimeters. Within this range, the carbon fiber length can be 5 to 25 millimeters, or 5 to 15 millimeters. In some embodiments, the carbon fiber is high modulus carbon fiber having a tensile modulus of at least 228 gigapascals.

The composition comprises the reinforcing filler in an amount of 1 to 60 weight percent, based on the total weight of the composition. Within this range, the reinforcing filler content can be 5 to 50 weight percent, or 5 to 40 weight percent, or 5 to 30 weight percent, or 10 to 30 weight percent, or 15 to 25 weight percent. In some embodiments, the reinforcing filler is carbon fiber.

The composition can, optionally, further comprise a high-heat polymer selected from the group consisting of polyimides (including polyetherimides), polysulfones (including polyethersulfones and polyphenylsulfones), polyether ether ketones, poly(phenylene sulfide)s, and combinations thereof. In some embodiments, the high-heat polymer has a glass transition temperature, or a melting point, or a glass transition temperature and a melting point in the range 140 to 300° C., determined by differential scanning calorimetry (DSC) according to ASTM D3418-15 at a heating rate of 20° C./minute under nitrogen.

When present, the high-heat polymer can be used in an amount of 1 to 59 weight percent, based on the total weight of the composition. Within this range, the high-heat polymer amount can be 5 to 50 weight percent, or 10 to 45 weight percent, or 10 to 40 weight percent, or 15 to 35 weight percent, or 20 to 30 weight percent.

In some embodiments, the composition exhibits a melt flow rate less than or equal to 20 grams per 10 minutes, determined according to ASTM D1238-13 at 300° C. and 1.2 kilogram load. Within the limit of less than or equal to 20 grams per 10 minutes, the melt flow rate can be 0.5 to 20 grams per 10 minutes, or 1 to 20 grams per 10 minutes.

In some embodiments, the composition exhibits a melt flow rate less than or equal to 100 grams per 10 minutes, determined according to ASTM D1238-13 at 330° C. and 2.16 kilogram load. Within the limit of less than or equal to 100 grams per 10 minutes, the melt flow rate at at 330° C.

and 2.16 kilogram load can be 1 to 100 grams per 10 minutes, or 5 to 80 grams per 10 minutes, or 5 to 50 grams per 10 minutes.

In some embodiments, the composition further comprises a polycarbonate lacking the second carbonate units and comprising fourth carbonate repeat units having the structure

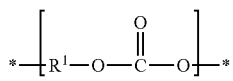

wherein at least 60 percent of the total number of $R^1$ groups are aromatic. In some embodiments. $R^1$ is independently at each occurrence a $C_6$-$C_{24}$ aromatic divalent group. In other embodiments, not all $R^1$ groups are aromatic, and the remainder are $C_2$-$C_{24}$ aliphatic divalent groups. In some embodiments, each $R^1$ is a radical of the formula

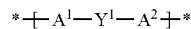

wherein each of $A^1$ and $A^2$ is independently a monocyclic divalent aryl radical, and $Y^1$ is a bridging radical having one or two atoms that separate $A^1$ from $A^2$. Examples of $A^1$ and $A^2$ include 1,3-phenylene and 1,4-phenylene, each optionally substituted with one, two, or three $C_1$-$C_6$ alkyl groups. The bridging radical $Y^1$ can be a $C_1$-$C_{12}$ (divalent) hydrocarbylene group. As used herein, the term "hydrocarbyl", whether used by itself, or as a prefix, suffix, or fragment of another term, refers to a residue that contains only carbon and hydrogen unless it is specifically identified as "substituted hydrocarbyl". The hydrocarbyl residue can be aliphatic or aromatic, straight-chain, cyclic, branched, saturated, or unsaturated. It can also contain combinations of aliphatic, aromatic, straight chain, cyclic, bicyclic, branched, saturated, and unsaturated hydrocarbon moieties. When the hydrocarbyl residue is described as substituted, it can contain heteroatoms in addition to carbon and hydrogen. In some embodiments, one atom separates $A^1$ from $A^2$. Illustrative examples of $Y^1$ radicals are —O—, —S—, —S(O)—, —S(O)$_2$—, —C(O)—, methylene (—CH$_2$—; also known as methylidene), ethylidene (—CH(CH$_3$)—), isopropylidene (—C(CH$_3$)$_2$—), neopentylidene, cyclohexylidene, cyclopentadecylidene, cyclododecylidene, adamantylidene, cyclohexylidene methylene, cyclohexylmethylene, and 2-[2.2.1]-bicycloheptylidene. In some embodiments, the polycarbonate lacking second carbonate units is a bisphenol A polycarbonate homopolymer. In some embodiments, the polycarbonate lacking second carbonate units comprises bisphenol A polycarbonate and has a melt volume flow rate of 15 to 150 cubic centimeters per 10 minutes determined according to ASTM D1238-13 at 300° C. and 1.2 kilogram load.

When the composition comprises the polycarbonate lacking second carbonate units, it can be used in an amount of 5 to 50 weight percent, based on the total weight of the composition. Within this range, the content of the polycarbonate lacking second carbonate units can be 10 to 45 weight percent, or 15 to 40 weight percent.

The composition can, optionally, further contain one or more additives known in the thermoplastic art. For example, the composition can, optionally, further comprise an additive chosen from stabilizers, lubricants, processing aids, drip retardants, nucleating agents, UV blockers, colorants (including dyes and pigments), antioxidants, anti-static agents, metal deactivators, and combinations thereof. When present, such additives are typically used in a total amount of less than or equal to 10 weight percent, or less than or equal to 5 weight percent, or less than or equal to 2 weight percent, or less than or equal to 1 weight percent, based on the total weight of the composition.

In some embodiments, the composition excludes one or more of polycarbonate-polysiloxane copolymers, polyesters, polyestercarbonates, polyestercarbonate-polysiloxane copolymers, styrene-acrylonitrile copolymers, and acrylonitrile-butadiene-styrene terpolymers.

In a very specific embodiment of the composition, $R^4$ is phenyl, and p, q, and j are each zero; the copolycarbonate comprises 60 to 75 mole percent of the bisphenol A carbonate units and 25 to 40 mole percent of the second carbonate units; and the composition comprises 70 to 90 weight percent of the copolycarbonate and 5 to 30 weight percent of carbon fiber.

In another very specific embodiment of the composition, $R^4$ is phenyl, and p, q, and j are each zero; the copolycarbonate comprises 60 to 75 mole percent of the bisphenol A carbonate units and 25 to 40 mole percent of the second carbonate units; and the composition comprises 35 to 70 weight percent of the copolycarbonate and 10 to 30 weight percent of carbon fiber and further comprises 10 to 45 weight percent of a bisphenol A polycarbonate having a melt volume flow rate of 15 to 150 cubic centimeters per 10 minutes determined according to ASTM D1238-13 at 300° C. and 1.2 kilogram load.

Another embodiment is an article comprising the composition in any of its above-described compositions. For example, the composition is useful for the fabrication of molds for thermoforming and injection molding; structural and semi-structural components for industrial, transportation, aerospace, and medical applications; and quick prototyping tools and preforms.

Another embodiment is a method of additive manufacturing, the method comprising: melt extruding the composition in any of its above-described variations to form a first molten extrusion; depositing the first molten extrusion in a predetermined pattern to form a first layer comprising an upper surface; further melt extruding the same composition to form a second molten extrusion; and depositing the second molten extrusion in a predetermined pattern to form a second layer comprising a lower surface in contact with the upper surface of the first layer.

In some embodiments of the method, it is a large format additive manufacturing method. In these embodiments, the method can, optionally, omit a fusing step. In contrast, a fusing step is typically required in fused filament fabrication methods. Another difference between large format additive manufacturing and fused filament fabrication is their melt flow requirements. Fused filament fabrication uses two types of materials simultaneously, a model material and a support material. The model (or build) material is used to print the three-dimensional part, and support material, as the name indicates, is used to temporarily "support" the model material during printing. Thus, the support material is only needed until the printed part cools and develops enough strength be self-supporting. The model material remains in the final 3D printed part, whereas the support material is removed after print is completed. The use of support material allows the fused filament fabrication process to use model materials that lack self-support properties during printing. In contrast, large format additive manufacturing uses only a model material and does not employ a support material. So, the model material must be self-supporting during printing. One way to characterize the self-support properties of a model material is via melt flow testing. Generally speaking, as melt flow increases, the model material becomes easier to print, but harder to support itself during printing. Therefore, it is preferable to use a model material with lower melt flow for large format additive manufacturing, while it is acceptable to use a model material with higher melt flow for fused filament fabrication. For example, as described above, the composition of the present invention is useful for large format additive manufacturing and can exhibit a melt flow rate less than or equal to 20 grams per 10 minutes, determined according to ASTM D1238-13 at 300° C. and 1.2 kilogram load. This melt flow is substantially less than the range of 30 to 75 grams per 10 minutes at 300° C. and 1.2 kilogram load, which is associated with the build material used for fused filament fabrication in International Patent Application Publication No. WO 2015/195527 A1 of Bihari et al., published 23 Dec. 2015.

In some embodiments of the method, the composition further comprises a high-heat polymer selected from the group consisting of polyimides (including polyetherimides), polysulfones (including polyethersulfones and polyphenylsulfones), polyether ether ketones, poly(phenylene sulfide)s, and combinations thereof, wherein the high-heat polymer has a glass transition temperature, or a melting point, or a glass transition temperature and a melting point in the range 140 to 300° C. determined by differential scanning calorimetry (DSC) according to ASTM D3418-15 at a heating rate of 20° C./minute under nitrogen. When present, the high-heat polymer can be used in an amount of 1 to 59 weight percent, based on the total weight of the composition. Within this range, the high-heat polymer amount can be 5 to 50 weight percent, or 10 to 45 weight percent, or 10 to 40 weight percent, or 15 to 35 weight percent, or 20 to 30 weight percent.

In some embodiments of the method, the composition exhibits a melt flow rate less than or equal to 20 grams per 10 minutes, determined according to ASTM D1238-13 at 300° C. and 1.2 kilogram load. Within the limit of less than or equal to 20 grams per 10 minutes, the melt flow rate can be 0.5 to 20 grams per 10 minutes, or 1 to 20 grams per 10 minutes.

In some embodiments of the method, the composition exhibits a melt flow rate less than or equal to 100 grams per 10 minutes, determined according to ASTM D1238-13 at 330° C. and 2.16 kilogram load. Within the limit of less than or equal to 100 grams per 10 minutes, the melt flow rate can be 1 to 100 grams per 10 minutes, or 5 to 80 grams per 10 minutes, or 5 to 50 grams per 10 minutes.

In some embodiments of the method, the composition further comprises 5 to 50 weight percent of a polycarbonate lacking the second carbonate units and comprising fourth carbonate repeat units having the structure

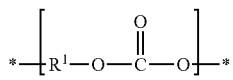

wherein at least 60 percent of the total number of $R^1$ groups are aromatic. In these embodiments, the polycarbonate lacking second carbonate units can, optionally, comprise bisphenol A polycarbonate and have a melt volume flow rate of 15 to 150 cubic centimeters per 10 minutes determined according to ASTM D1238-13 at 300° C. and 1.2 kilogram load.

In some embodiments of the method, $R^4$ is phenyl, and p, q, and j are each zero; the copolycarbonate comprises 60 to 75 mole percent of the bisphenol A carbonate units and 25 to 40 mole percent of the second carbonate units; and the composition comprises 70 to 90 weight percent of the copolycarbonate and 5 to 30 weight percent of carbon fiber.

In some embodiments of the method. $R^4$ is phenyl, and p, q, and j are each zero; the copolycarbonate comprises 60 to 75 mole percent of the bisphenol A carbonate units and 25 to 40 mole percent of the second carbonate units; and the composition comprises 35 to 70 weight percent of the copolycarbonate and 10 to 30 weight percent of carbon fiber and further comprises 10 to 45 weight percent of a bisphenol A polycarbonate having a melt volume flow rate of 15 to 150 cubic centimeters per 10 minutes determined according to ASTM D1238-13 at 300° C. and 1.2 kilogram load.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

EXAMPLES

Components used to form experimental compositions are summarized in Table 1. Bisphenol A polycarbonate (BPAPC) resins were prepared by interfacial polymerization using methods known in the art.

TABLE 1

| Component | Description |
|---|---|
| BPAPC 1 | p-Cumylphenol-endcapped bisphenol A polycarbonate having a weight average molecular weight of about 29,900 grams/mole and a dispersity of about 2.5 as determined by gel permeation chromatography using bisphenol A-based polycarbonate standards. |
| BPAPC 2 | p-Cumylphenol-endcapped bisphenol A polycarbonate having a weight average molecular weight of about 21,900 grams/mole and a dispersity of about 2.5 as determined by gel permeation chromatography using bisphenol A-based polycarbonate standards. |
| BPAPC 3 | p-Cumylphenol-endcapped bisphenol A polycarbonate having a weight average molecular weight of about 18,200 grams/mole and a dispersity of about 2.5 as determined by gel permeation chromatography using bisphenol A-based polycarbonate standards. |
| HHPC | p-Cumylphenol-endcapped copolycarbonate (High Heat PolyCarbonate) containing 67 mole percent bisphenol A carbonate units and 33 mole percent 2-phenyl-3,3-bis(4-hydroxyphenyl)phthalimidine carbonate units, having a weight average molecular weight of about 23,000 grams/mole and a dispersity of about 2.5 as determined by gel permeation chromatography using bisphenol A-based polycarbonate standards; preparable according to the synthetic procedure of Comparative Example 3 of International Patent Application Publication No. WO 2015/048735 A1 of Mahood et al., published 2 Apr. 2015. |
| PC-Si | p-Cumylphenol endcapped block copolymer with polycarbonate blocks containing bisphenol A carbonate repeat units and polysiloxane blocks containing dimethylsiloxane repeat units, the end-capped polydimethylsiloxane macromer having an average of about 45 dimethylsiloxane units per molecule; the copolymer having a weight average molecular weight of about 30,000 grams/mole and a polysiloxane content of about 20 weight percent; preparable according to the procedure of paragraphs [0061] to [0064] of International Patent Application Publication No. WO 2017/019969 A1 of Hoover et al. |

TABLE 1-continued

| Component | Description |
|---|---|
| PEC | p-Cumylphenol endcapped block polyestercarbonate with polyester blocks containing 1,3-phenylene isophthalate-co-terephthalate repeat units and carbonate blocks containing bisphenol A carbonate and resorcinol carbonate units, having about 82 mole percent of resorcinol ester (50:50 iso-phthalate/terephthalate) linkages, about 9 mole percent resorcinol carbonate linkages, and about 9 mole percent bisphenol A carbonate linkages, and having a weight average molecular weight of about 20,000 grams/mole and a dispersity of about 2.5 as determined by gel permeation chromatography using bisphenol A-based polycarbonate standards; preparable according to the procedure of Comparative Example 2-4 of U.S. Pat. No. 7,790,292 B2 to Colborn et al. |
| PEI | Polyetherimide comprising structural units derived from bisphenol A dianhydride and equimolar m-phenylenediamine, having a melt flow rate of about 7 to 11 grams/10 minutes measured at 337° C. and 6.7 kilograms force according to ASTM D1238-13; obtained as ULTEM ™ 1000 resin from SABIC. |
| PEI-Si | A random poly(etherimide-dimethylsiloxane)copolymer comprising structural units derived from bisphenol A dianhydride, m-phenylenediamine, and an aminopropyl-terminated polydimethylsiloxane containing on average 10 silicon atoms, the copolymer containing about 34 weight percent dimethylsiloxane based on the total weight of the copolymer, and having a melt flow rate of about 3 to 11 grams/10 minutes measured at 337° C. and 6.7 kilograms force according to ASTM D1238-13; preparable according to the Example 3 synthesis of "random silicone polyimide" in U.S. Pat. No. 4,808,686 to Cella et al. |
| PES | Poly(1,4-phenylene ether-sulfone), CAS Reg. No. 25667-42-9; obtained as ULTRASON ™ E2010 resin from BASF. |
| AO 1 | Tris(2,4-di-tert-butylphenyl) phosphite, CAS Reg. No. 31570-04-4; obtained as IRGAFOS ™ 168 from BASF Corp. |
| AO 2 | Octadecyl 3,5-di-tert-butyl-4-hydroxyhydrocinnamate, CAS Reg. No. 2082-79-3; obtained as IRGANOX ™ 1076 from BASF |
| PETS | Pentaerythritol tetrastearate, CAS Reg, No. 115-83-3; obtained from FACI SpA. |
| CB | Carbon black, CAS No. 1333-86-4, obtained as PRINTEX ™ 80 powder from Orion Engineered Carbons. |
| CF 1 | Carbon fiber, CAS Reg. No. 7440-44-0, having a diameter of about 7 micrometers and a pre-compounded length of about 6 millimeters; obtained as SIGRAFIL ™ C C6-4.0/240-T130 from SGL Group. |
| CF 2 | Carbon fiber, CAS Reg. No. 7440-44-0, having a diameter of about 7 micrometers and a pre-compounded length of about 6 millimeters; obtained as TENAX ™-C HT C483 6 mm from Teijin Group. |
| CF 3 | Carbon fiber, CAS Reg. No. 7440-44-0, having a diameter of about 7 micrometers and a pre-compounded length of about 6 millimeters; obtained as SGL C C6-4.0/240-T190 from SGL Group. |
| GF | Glass fiber having a diameter of about 10 micrometers and a pre-compounded length of about 4 millimeters; obtained as JM 718 from Johns Manville. |
| Flat GF | Flat glass fiber having cross-sectional dimensions of about 28 micrometers by about 7 micrometers, and a pre-compounded length of about 3 millimeters; obtained as CSG3PA-830S from Nittobo (Japan). |
| Milled GF | Milled glass fiber having a diameter of about 16 micrometers and a pre-compounded length of about 0.79 millimeters; obtained as 739DC from Owens Corning. |

Experimental compositions are summarized in Table 2, where component amounts are expressed in weight percent based on the total weight of the composition, Compositions were compounded on a twin-screw extruder obtained as ZSK-40 SC from Coperion operating at composition-dependent barrel temperatures: 288° C. for Comparative Examples 1 and 2; 304° C. for Example 1; 316° C. for Example 2: 327° C. for Examples 3 and 4 and Comparative Examples 6-8; 360° C. for Comparative Example 3; and 382-399° C. for Comparative Examples 4 and 5. The extruded strands were cooled and pelletized. Before use for additive manufacturing, pellets were dried for four hours at 120° C. (Comparative Examples 1 and 2), 130° C. (Examples 1-4. Comparative Examples 3, 4, 6-8), or 150° C. (Comparative Example 5). Selected glass transition temperatures, determined by differential scanning calorimetry (DSC) according to ASTM D3418-15 at a heating rate of 20° C./minute under nitrogen, were as follows: 145° C. for Example 1, 170° C. for Example 2, 186° C. for Example 3, 190° C. for Comparative Example 6, and 193° C. for Comparative Example 7 and Comparative Example 8.

TABLE 2

| | C. Ex. 1 | C. Ex. 2 | Ex. 1 | Ex. 2 | Ex. 3 | C. Ex. 3 | C. Ex. 4 | C. Ex. 5 | C. Ex. 6 | C. Ex. 7 | C. Ex. 8 | Ex. 4 |
|---|---|---|---|---|---|---|---|---|---|---|---|---|
| BPAPC 1 | 21.928 | 71.050 | 0.000 | 0.000 | 0.000 | 0.000 | 0.000 | 0.000 | 0.000 | 0.000 | 0.000 | 0.000 |
| BPAPC 2 | 57.808 | 7.900 | 0.000 | 0.000 | 0.000 | 0.000 | 0.000 | 0.000 | 0.000 | 0.000 | 0.000 | 0.000 |
| BPAPC 3 | 0.000 | 0.000 | 36.000 | 20.000 | 0.000 | 0.000 | 0.000 | 0.000 | 0.000 | 0.000 | 0.000 | 0.000 |
| HHPC | 0.000 | 0.000 | 43.784 | 59.706 | 79.220 | 0.000 | 0.000 | 0.000 | 78.220 | 78.220 | 78.220 | 78.220 |
| PC-Si | 0.000 | 0.000 | 0.000 | 0.000 | 0.000 | 6.400 | 0.000 | 0.000 | 0.000 | 0.000 | 0.000 | 0.000 |
| PEC | 0.000 | 0.000 | 0.000 | 0.000 | 0.000 | 31.200 | 0.000 | 0.000 | 0.000 | 0.000 | 0.000 | 0.000 |
| PEI | 0.000 | 0.000 | 0.000 | 0.000 | 0.000 | 39.920 | 0.000 | 79.000 | 0.000 | 0.000 | 0.000 | 0.000 |
| PEI-Si | 0.000 | 0.000 | 0.000 | 0.000 | 0.000 | 2.400 | 0.000 | 0.000 | 0.000 | 0.000 | 0.000 | 0.000 |
| PES | 0.000 | 0.000 | 0.000 | 0.000 | 0.000 | 0.000 | 80.000 | 0.000 | 0.000 | 0.000 | 0.000 | 0.000 |
| AO 1 | 0.048 | 0.050 | 0.035 | 0.048 | 0.124 | 0.080 | 0.000 | 0.000 | 0.124 | 0.124 | 0.124 | 0.124 |
| AO 2 | 0.000 | 0.000 | 0.018 | 0.024 | 0.062 | 0.000 | 0.000 | 0.000 | 0.062 | 0.062 | 0.062 | 0.062 |
| PETS | 0.216 | 0.000 | 0.119 | 0.162 | 0.435 | 0.000 | 0.000 | 0.000 | 0.435 | 0.435 | 0.435 | 0.435 |
| CB | 0.000 | 0.000 | 0.044 | 0.060 | 0.160 | 0.000 | 0.000 | 0.000 | 0.160 | 0.160 | 0.160 | 0.160 |
| CF 1 | 20.000 | 0.000 | 20.000 | 20.000 | 20.000 | 20.000 | 20.000 | 0.000 | 0.000 | 0.000 | 0.000 | 21.000 |
| CF 2 | 0.000 | 21.000 | 0.000 | 0.000 | 0.000 | 0.000 | 0.000 | 0.000 | 0.000 | 0.000 | 0.000 | 0.000 |
| CF 3 | 0.000 | 0.000 | 0.000 | 0.000 | 0.000 | 0.000 | 0.000 | 21.000 | 0.000 | 0.000 | 0.000 | 0.000 |
| GF | 0.000 | 0.000 | 0.000 | 0.000 | 0.000 | 0.000 | 0.000 | 0.000 | 21.000 | 0.000 | 0.000 | 0.000 |
| Flat GF | 0.000 | 0.000 | 0.000 | 0.000 | 0.000 | 0.000 | 0.000 | 0.000 | 0.000 | 21.000 | 0.000 | 0.000 |
| Milled GF | 0.000 | 0.000 | 0.000 | 0.000 | 0.000 | 0.000 | 0.000 | 0.000 | 0.000 | 0.000 | 21.000 | 0.000 |

Mechanical and thermal properties of the compositions are summarized in Table 3. Mechanical properties were determined using injection molded test articles. Melt volume flow rate ("MVR-1" and "MVR-2") values, expressed in units of cubic centimeters per 10 minutes, were determined according to ASTM D1238-13 at the temperature and load specified with each value. Tensile properties were determined according to ASTM D638-14 at 23° C. Tensile modulus and tensile strength at break value are expressed in units of megapascals. Tensile elongation at break values are expressed in units of percent. Flexural properties were determined according to ASTM D790-17 at 23° C. Flexural modulus and flexural stress at break values are expressed in units of megapascals. Notched Izod impact strength values, expressed in units of joules/meter, were determined according to ASTM D256-10e1 at 23° C. Heat deflection temperature values, expressed in units of degrees centigrade, were determined according to ASTM D648-18 at 1.82 megapascals. The results in Table 3 demonstrate that, relative to Comparative Examples 1 and 2 containing bisphenol A polycarbonate, Examples 1-4 containing high heat polycarbonate exhibit superior heat resistance (manifested as higher heat deflection temperature values) while preserving mechanical strength. Relative to Comparative Examples 3, 4, and 5, containing, respectively, a bisphenol A polycarbonate/polyetherimide blend, a polyethersulfone, and a polyetherimide, Examples 1-4 containing high heat polycarbonate exhibit improved melt flow.

Figure 2:
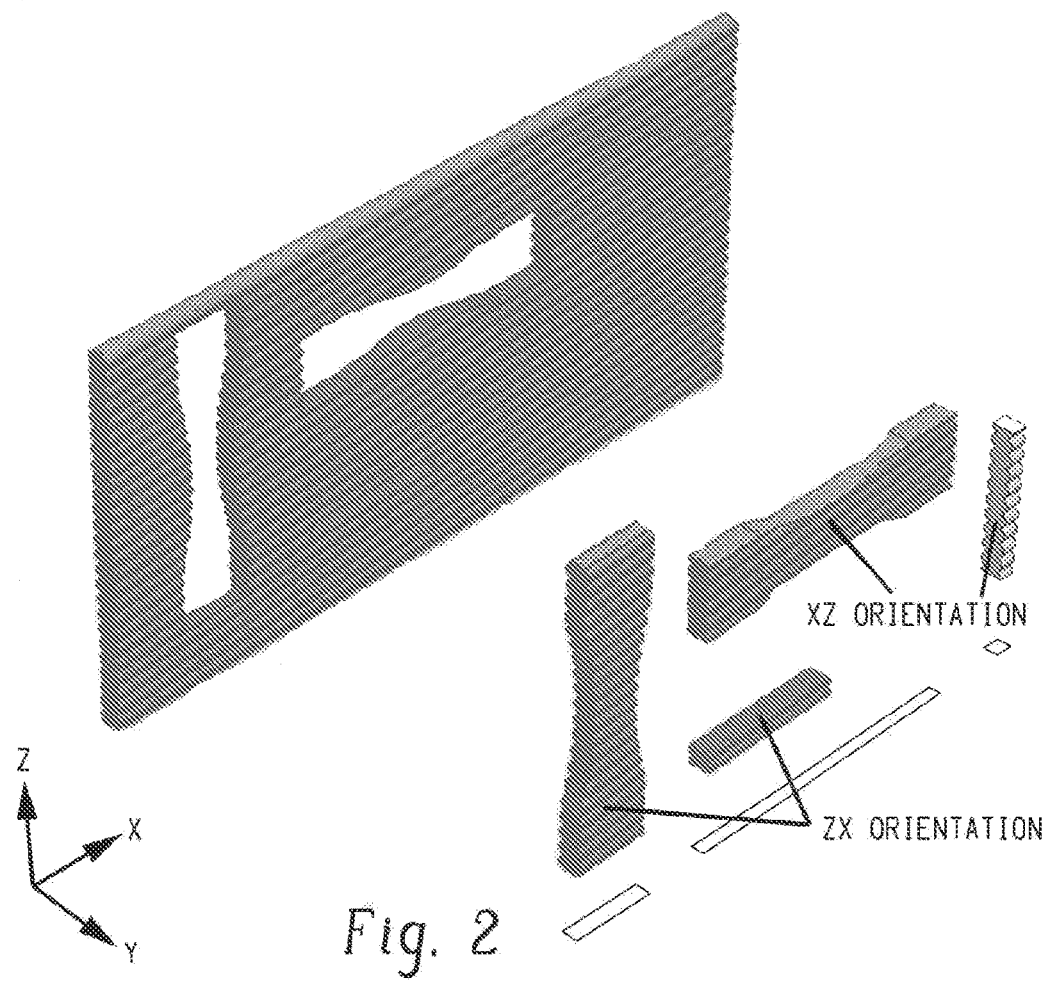
FIG. 2 illustrates the orientation of test articles cut from the printed object and used for determination of tensile and flexural properties.
Figure 3:
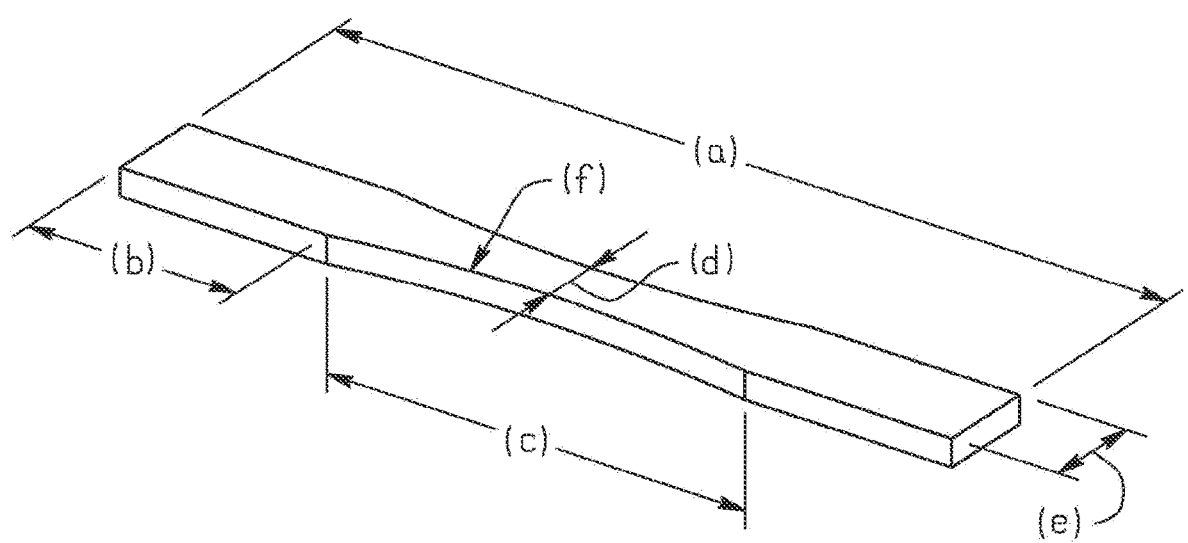
FIG. 3 illustrates dimensions of the test article used for determination of tensile properties.

Each composition was used to print a six-sided object using large format additive manufacturing. The large format additive manufacturing printer was obtained as a CL-BAAM6X12 big area additive manufacturing machine from Cincinnati Incorporated. FIG. 1 is an image of a representative six-sided object. For each composition, Table 4 includes the printing temperature and comments on printability and surface finish, which was determined visually and assigned a rating from 1 (poor finish) to 5 (very good finish). Test articles for determination of tensile and flexural properties were cut from one side of the six-sided object using a water jet cutting tool obtained as OMAX 55100 Abrasive Water Jet Cutting Machine from OMAX. Test articles could not be cut from the six-sided object printed from the glass-fiber-containing Comparative Example 6 composition, because the printed part cracked during cutting. FIG. 2 illustrates the orientation of test articles cut from the printed object and used for determination of tensile and flexural properties. The x-, y-, and z-axes are the conventional axes associated with printers for additive manufacturing. Tensile properties were determined using the dog-bone-shaped test articles shown in FIG. 2, and flexural properties were determined from the rectangle-shaped test articles shown in FIG. 2. FIG. 3 illustrates the dimensions of the test articles used to determine tensile properties: The longest dimension, labeled "(a)", is 30.48 centimeters (12.0 inches); the rectangular grip (end) areas have a length. "(b)", of 7.62 centimeters (3.0 inches) and a width. "(e)", of 3.81 centimeters (1.5 inches); the center portion has a length, "(c)", of 15.24 centimeters (6.0 inches) and a narrowest width, "(d)", of 2.54 centimeters (1.0 inch); the center portion is bounded on its sides by arcs, "(f)", defined by a

TABLE 3

| | C. Ex. 1 | C. Ex. 2 | Ex. 1 | Ex. 2 | Ex. 3 | C. Ex. 3 | C. Ex. 4 | C. Ex. 5 | C. Ex. 6 | C. Ex. 7 | C. Ex. 8 | Ex. 4 |
|---|---|---|---|---|---|---|---|---|---|---|---|---|
| MVR-1 (cm³/10 min) | 10.2 at 300° C., 1.2 kg | 3.25 at 300° C., 1.2 kg | 50.9 at 330° C., 2.16 kg | 48.3 at 330° C., 2.16 kg | 29.6 at 330° C., 2.16 kg | 38.3 at 360° C., 5 kg | 30.3 at 360° C., 10 kg | 6.2 at 360° C., 5 kg | 13.4 at 330° C., 1.2 kg | 10.2 at 330° C., 1.2 kg | 13.1 at 330° C., 1.2 kg | 12.3 at 330° C., 1.2 kg |
| MVR-2 (cm³/10 min) | 51.3 at 330° C., 2.16 kg | 16.1 at 330° C., 2.16 kg | — | — | — | 4.9 at 330° C., 2.16 kg | 1.6 at 330° C., 2.16 kg | — | 23.2 at 330° C., 2.16 kg | 17.2 at 330° C., 2.16 kg | 23.9 at 330° C., 2.16 kg | 28.0 at 330° C., 2.16 kg |
| Tensile modulus (MPa) | 12760 | 12160 | 12620 | 12260 | 13120 | 14180 | 14320 | 13380 | 6356 | 6748 | 3906 | 3600 |
| Tensile strength at break (MPa) | 162 | 132 | 152 | 151 | 164 | 179 | 177 | 186 | 103 | 126 | 65.3 | 156 |
| Tensile elongation at break (%) | 2.45 | 2.17 | 2.05 | 2.11 | 1.92 | 1.9 | 1.75 | 2.05 | 2.22 | 2.94 | 3.24 | 1.68 |
| Flexural modulus (MPa) | 12100 | 11200 | 12000 | 11800 | 13000 | 14000 | 14200 | 12800 | 5910 | 6150 | 3350 | 13500 |
| Flexural stress at break (MPa) | 246 | 198 | 220 | 221 | 235 | 243 | 240 | 257 | 132 | 176 | 88.8 | 196 |
| Notched Izod impact strength (J/m) | 103 | 82.2 | 64 | 56.7 | 55.9 | 95.2 | 65.2 | 57 | 64.1 | 75.5 | 32.9 | 51.5 |
| Heat deflection temp., 1.82 MPa (° C.) | 139 | 143 | 161 | 170 | 179 | 167 | 215 | 210 | 183 | 185 | 172 | 178 | circle with a radius of 46.04 centimeters (18.125 inches). The test articles used to determine tensile properties had a thickness that depended on the 3D printed layer width and was typically in the range 8.9 to 11.4 millimeters (0.35 to 0.45 inch). Specific thicknesses are listed in Table 4. The test articles used to determine flexural properties were rectangular prisms having a length of 229 millimeters (9 inches), a width of 12.7 millimeters (0.5 inch), and a thickness that depended on the 3D printed layer width and was typically in the range 8.9 to 11.4 millimeters (0.35 to 0.45 inch). Specific thicknesses are listed in Table 4. With reference to FIG. 2, test articles labeled as having the XZ orientation were used to determine tensile or flexural properties along the X axis (e.g., "Tensile strength—X (MPa)" in Table 4). Again with reference to FIG. 2, test articles labeled as having the ZX orientation were used to determine tensile or flexural properties along the Z axis (e.g., "Tensile strength—Z (MPa)" in Table 4).

After being cut with the water jet, test articles were dried in a 120° C. (Comparative Examples 1-3 and 6-8. Examples 1-4) or 150° C. (Comparative Examples 4 and 5) vacuum oven for four hours. After drying, test articles were conditioned for at least 24 hours at 23° C. and 50 percent relative humidity before use for property determination. Tensile testing was conducted at 23° C. according to ASTM D638-14 with the following exceptions: the test article had the dimensions specified above; an extensometer or strain gauge was used for measuring strains; the test speed was 5 millimeters/minute; for each composition, testing was conducted on five test articles, each test article failing within 19 millimeters (0.75 inch) of the mid-point of the article; tensile strength was calculated from the width at the location of failure. Flexural testing was conducted at 23° C. according to ASTM D790-17 with the following exceptions: the test article had the dimensions specified above (thickness depends on composition).

The results in Table 4 demonstrate that relative to Comparative Examples 1 and 2 containing bisphenol A polycarbonate but no copolycarbonate, Examples 1-4 containing the copolycarbonate exhibit greater thermal resistance as indicated by higher heat deflection temperatures, while still having comparable mechanical properties. Relative to Comparative Examples 4 containing polyethersulfone. Examples 1-4 containing the copolycarbonate exhibit greater improved printability. Relative to Comparative Examples 9 containing the copolycarbonate with circular glass fibers. Examples 1-4 containing the copolycarbonate with carbon fibers exhibit lower residual stress, as indicated by the inability to cut parts from the former.

TABLE 4

|  | C. Ex. 1 | C. Ex. 2 | Ex. 1 | Ex. 2 | Ex. 3 | C. Ex. 3 |
|---|---|---|---|---|---|---|
| Printing temperature (° C.) | 305 | 320 | 330 | 335 | 370 | 365 |
| Printability | Very poor print, flow inconsistent | Printed within acceptable extruder torque limits, Surface finish = 4 | Printed within acceptable extruder torque limits, Surface finish = 4 | Printed within acceptable extruder torque limits, Surface finish = 4 | Printed within acceptable extruder torque limits, Surface finish = 4 | Printed within acceptable extruder torque limits, Surface finish = 4 |
| Tensile article thickness-X (mm) | 11.00 | 10.31 | 9.91 | 9.55 | 9.98 | 10.62 |
| Tensile strength-X (MPa) | 102.1 | 122.1 | 107.2 | 81.49 | 101.1 | 106.5 |
| Tensile strain-X (%) | 2.68 | 1.57 | 1.23 | 1.06 | 1.55 | 2.4 |
| Tensile stiffness-X (MPa) | 5.02 | 12.19 | 11.78 | 9.47 | 10.01 | 5.74 |
| Tensile article thickness-Z (mm) | 8.66 | 8.31 | 8.13 | 7.75 | 8.03 | 8.59 |
| Tensile strength-Z (MPa) | 13.5 | 49.5 | 25.8 | 17.0 | 20.4 | 30.7 |
| Tensile strain-Z (%) | 1.09 | 1.76 | 1.07 | 0.88 | 1.04 | 2.91 |
| Tensile stiffness-Z (MPa) | 1.49 | 3.28 | 2.28 | 2.09 | 2.12 | 1.33 |
| Flexural article thickness-X (mm) | 10.11 | 9.98 | 10.34 | 9.75 | 9.98 | 10.54 |
| Flexural strength-X (MPa) | 142.2 | 172.9 | 134.1 | 107.4 | 126.3 | 131.1 |
| Flexural strain at break-X % | 1.66 | 1.9 | 1.6 | 1.40 | 1.50 | 1.54 |
| Stiffness-X (GPa) | 10.45 | 11.88 | 10 | 9.00 | 9.70 | 9.85 |
| Flexural article thickness-Z (mm) | 8.36 | 8.36 | 8.33 | 7.95 | 7.97 | 9.17 |
| Flexural strength-Z (MPa) | 38.4 | 65.3 | 26.6 | 17.6 | 23.1 | 40.5 |

TABLE 4-continued

|  |  |  |  |  |  |  |
|---|---|---|---|---|---|---|
| Flexural strain at break-Z (%) | 1.87 | 2.42 | 1.1 | 0.81 | 1.10 | 2.88 |
| Stiffness-Z (GPa) | 2.44 | 3.17 | 3.00 | 2.62 | 2.65 | 1.73 |

|  | C. Ex. 4 | C. Ex. 5 | C. Ex. 6 | C. Ex. 7 | C. Ex. 8 | Ex. 4 |
|---|---|---|---|---|---|---|
| Printing temperature (° C.) | 310, 335 | 405 | 345 | 345 | 330 | 345 |
| Printability | Had to increase print temp to stay within acceptable extruder torque limits, Surface finish = 3 | Printed within acceptable extruder torque limits, Surface finish = 4 | Printed within acceptable extruder torque limits, Surface finish = 4 | Printed within acceptable extruder torque limits, Surface finish = 4 | Printed within acceptable extruder torque limits, Surface finish = 4.5 | Printed within acceptable extruder torque limits, Surface finish = 3.5 |
| Tensile article thickness-X (mm) | 9.60 | 9.75 | — | 10.41 | 11.18 | 10.11 |
| Tensile strength-X (MPa) | 92.1 | 139.6 | — | 87.80 | 56.60 | 100.9 |
| Tensile strain-X (%) | 1.8 | 2.36 | — | 4.33 | 5.17 | 2.34 |
| Tensile stiffness-X (MPa) | 6.24 | 7.39 | — | 2.70 | 1.59 | 5.01 |
| Tensile article thickness-Z (mm) | 8.03 | 7.98 | — | 8.81 | 9.73 | 8.26 |
| Tensile strength-Z (MPa) | 28.7 | 42.7 | — | 31.8 | 35.80 | 20.62 |
| Tensile strain-Z (%) | 2.31 | 1.92 | — | 2.80 | 3.04 | 1.80 |
| Tensile stiffness-Z (MPa) | 1.48 | 2.66 | — | 1.19 | 1.38 | 1.19 |
| Flexural article thickness-X (mm) | 9.17 | 9.86 | — | 10.64 | 11.28 | 10.03 |
| Flexural strength-X (MPa) | 118 | 186 | — | 109.8 | 83.6 | 130.3 |
| Flexural strain at break-X % | 1.28 | 1.90 | — | 2.45 | 3.91 | 1.48 |
| Stiffness-X (GPa) | 10.3 | 11.4 | — | 5.11 | 2.95 | 10.23 |
| Flexural article thickness-Z (mm) | 7.77 | 7.95 | — | 8.92 | 9.73 | 8.43 |
| Flexural strength-Z (MPa) | 36.7 | 56.3 | — | 37.4 | 45.7 | 21.0 |
| Flexural strain at break-Z (%) | 1.98 | 1.90 | — | 1.81 | 2.21 | 1.73 |
| Stiffness-Z (GPa) | 2.19 | 3.40 | — | 2.28 | 2.36 | 1.95 |

Figure 4:
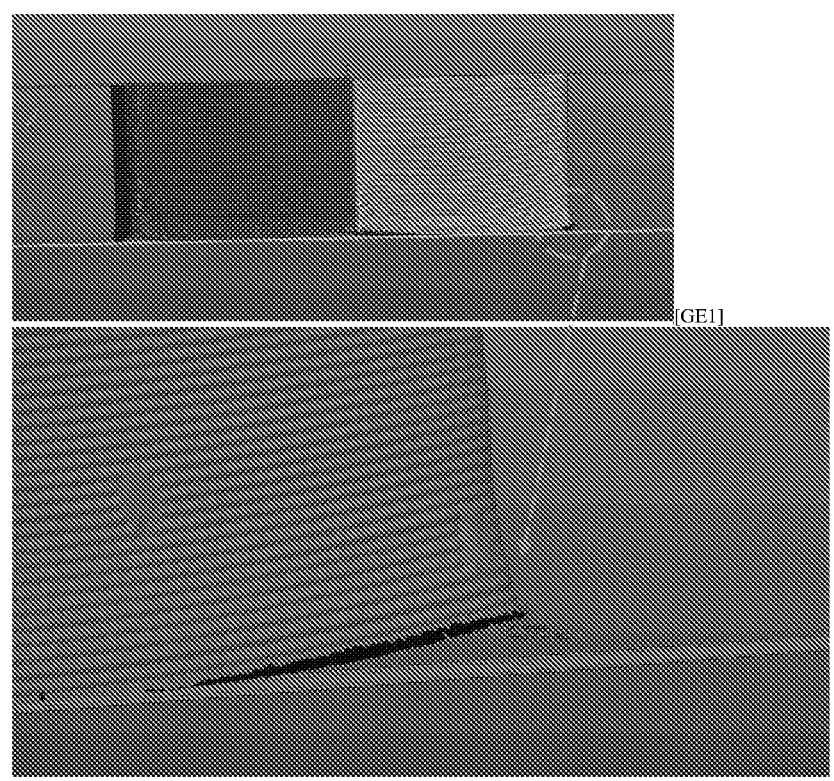
FIG. 4 is a side view image of a six-sided object exhibiting warpage, including an inset magnified image of a warped corner.

As noted above, each composition was used to print a six-sided object using large format additive manufacturing. Warpage was determined for as-printed objects prepared from the Comparative Examples 6-8 and Example 4 compositions. Warpage is a distortion in which the surfaces of a printed part depart from the intended shape of the part. Warpage results from residual stress in an as-printed part, which, in turn, is caused by differential shrinkage of material as the part is being printed. Warpage is greatest for the first layers printed. Hence, warpage was determined for six corners, with corner 1 being printed first, corner 2 being printed second, etc. FIG. 4 consists of two images of a six-side object prepared by large format additive manufacturing. The upper image is a side view of the object showing three faces. Also shown in the upper image are upper and lower imaginary lines corresponding to side views of the idealized planes defining the upper and lower surfaces of the object. In FIG. 4, the lower image is a magnification of a portion of the upper image, the magnification showing the lower right corner of the object. For each six-sided object, the six outward-facing planes were scanned with a HandySCAN™ 700 Portable 3D Scanner from Creaform. For each outward-facing plane, VXelements Version 6 software by Creaform was used to calculate a best-fit ideal plane, and the deviation, in millimeters, from the ideal plane was calculated for each corner. This deviation is the warpage value for the corner. Table 5 presents warpage values for each of six corners for objects printed from the Comparative Examples 6-8 and Example 4 compositions. The Table 5 results show significantly reduced warpage values for carbon fiber-containing Example 4 relative to glass fiber-containing Comparative Examples 6-8.

TABLE 5

| Corner | Warpage (millimeters) | | | |
|---|---|---|---|---|
| | C. Ex. 6 | C. Ex. 7 | C. Ex. 8 | Ex. 4 |
| 1 | 10.0 | 8.1 | 16.8 | 4.9 |
| 2 | 9.0 | 9.0 | 17.4 | 2.7 |
| 3 | 7.5 | 10.8 | 13.8 | 2.0 |
| 4 | 5.9 | 7.3 | 12.5 | 3.3 |
| 5 | 5.8 | 9.4 | 14.6 | 6.8 |
| 6 | 3.6 | 9.8 | 14.4 | 6.3 |

Melt flow rates were determined for the compositions summarized in Table 6, which were prepared from components described in Table 1. Melt flow rates, which are expressed in units of grams per 10 minutes, were determined according to ASTM D1238-13 at 300° C. and 1.2 kilogram load, and at 330° C. and 1.2 kilogram load. Results are presented in Table 6. Notes especially the results for Example 5. With its minimum amounts of HHPC and carbon fiber and its use of low molecular weight BPAPC 3, the Example 5 composition is expected to be representative of the highest melt flow for compositions within the scope of the invention. Its melt flow rate of 15.6 grams per 10 minutes at 300° C. and 1.2 kilograms is substantially less than the minimum melt flow rate of 30 grams per 10 minutes at 300° C. and 1.2 kilograms required by International Patent Application Publication No. WO 2015/195527 A1 of Bihari et al., published 23 Dec. 2015.

TABLE 6

| | Ex. 5 | Ex. 6 | Ex. 7 | Ex. 8 |
|---|---|---|---|---|
| COMPOSITIONS | | | | |
| HHPC | 40.000 | 40.000 | 98.219 | 50.000 |
| BPAPC 3 | 58.219 | 0.000 | 0.000 | 29.219 |
| AO 1 | 0.124 | 0.124 | 0.124 | 0.124 |
| AO 2 | 0.062 | 0.062 | 0.062 | 0.062 |
| PETS | 0.435 | 0.435 | 0.435 | 0.435 |
| CB | 0.160 | 0.160 | 0.160 | 0.160 |
| CF 1 | 1.000 | 59.219 | 1.000 | 20.00 |
| PROPERTIES | | | | |
| MFR at 300° C., 1.2 kg (g/10 min) | 15.6 | <1 | 2.99 | 5.93 |
| MFR at 330° C., 2.16 kg (g/10 min) | 77.6 | <1 | 22.1 | 38.9 |

The invention includes at least the following aspects.

Aspect 1: A composition, comprising, based on the weight of the composition: 40 to 99 weight percent of a copolycarbonate comprising, based on 100 mole percent total carbonate units, 40 to 90 mole percent bisphenol A carbonate units and 10 to 60 mole percent of second carbonate units of the formula

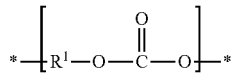

wherein $R^a$ and $R^b$ are independently at each occurrence $C_1$-$C_{12}$ alkyl, $C_2$-$C_{12}$ alkenyl, or $C_1$-$C_{12}$ alkoxyl; $R^3$ is independently at each occurrence $C_1$-$C_{12}$ alkyl; $R^4$ is hydrogen, $C_2$-$C_6$ alkyl, or phenyl optionally substituted with 1, 2, 3, 4, or 5 $C_1$-$C_6$ alkyl groups; and p, q, and j are each independently 0, 1, 2, 3, or 4; and 1 to 60 weight percent of a reinforcing filler selected from the group consisting of carbon fiber, graphene platelets, aromatic polyamide fibers, aromatic polyester fibers, ultra-high molecular weight polyethylene fibers, and combinations thereof.

Aspect 2: The composition of aspect 1, wherein the reinforcing filler is carbon fiber having a diameter of 4 to 100 micrometers.

Aspect 3: The composition of aspect 1 or 2, exhibiting a melt flow rate less than or equal to 20 grams per 10 minutes, determined according to ASTM D1238-13 at 300° C. and 1.2 kilogram load.

Aspect 4: The composition of any one of aspects 1-3, further comprising 5 to 50 weight percent of a polycarbonate lacking the second carbonate units and comprising fourth carbonate repeat units having the structure $$*{-}{\left[ R^1 {-} O {-} \overset{O}{\underset{\|}{C}} {-} O \right]}{-}*$$

wherein at least 60 percent of the total number of $R^1$ groups are aromatic.

Aspect 5: The composition of aspect 4, wherein the polycarbonate lacking the second carbonate units comprises bisphenol A polycarbonate and has a melt volume flow rate of 15 to 150 cubic centimeters per 10 minutes determined according to ASTM D1238-13 at 300° C. and 1.2 kilogram load.

Aspect 6: The composition of aspect 1, wherein $R^4$ is phenyl, and p, q, and j are each zero; the reinforcing filler is carbon fiber having a diameter of 4 to 100 micrometers; the copolycarbonate comprises 60 to 75 mole percent of the bisphenol A carbonate units and 25 to 40 mole percent of the second carbonate units; and the composition comprises 70 to 90 weight percent of the copolycarbonate and 5 to 30 weight percent of carbon fiber.

Aspect 7: The composition of aspect 1, wherein $R^4$ is phenyl, and p, q, and j are each zero; the reinforcing filler is carbon fiber having a diameter of 4 to 100 micrometers; the copolycarbonate comprises 60 to 75 mole percent of the bisphenol A carbonate units and 25 to 40 mole percent of the second carbonate units; and the composition comprises 35 to 70 weight percent of the copolycarbonate and 10 to 30 weight percent of carbon fiber and further comprises 10 to 45 weight percent of a bisphenol A polycarbonate having a melt volume flow rate of 15 to 150 cubic centimeters per 10 minutes determined according to ASTM D1238-13 at 300° C. and 1.2 kilogram load.

Aspect 8: An article comprising the composition of any one of aspects 1-7.

Aspect 9: A method of additive manufacturing, the method comprising: melt extruding the composition of any one of aspects 1-7 to form a first molten extrusion; depositing the first molten extrusion in a predetermined pattern to form a first layer comprising an upper surface; further melt extruding the same composition to form a second molten extrusion; and depositing the second molten extrusion in a predetermined pattern to form a second layer comprising a lower surface in contact with the upper surface of the first layer.

Aspect 10: The method of aspect 8, comprising melt extruding the composition of aspect 2.

Aspect 11: The method of aspect 8, comprising melt extruding the composition of aspect 3.

Aspect 12: The method of aspect 8, comprising melt extruding the composition of aspect 4.

Aspect 13: The method of aspect 8, comprising melt extruding the composition of aspect 5.

Aspect 14: The method of aspect 8, comprising melt extruding the composition of aspect 6.

Aspect 15: The method of aspect 8, comprising melt extruding the composition of aspect 7.

The invention claimed is:

1. A composition, comprising, based on the weight of the composition:

40 to 75 weight percent of a copolycarbonate comprising, based on 100 mole percent total carbonate units, 60 to 75 mole percent bisphenol A carbonate units and to 25 to 40 mole percent of second carbonate units of the formula

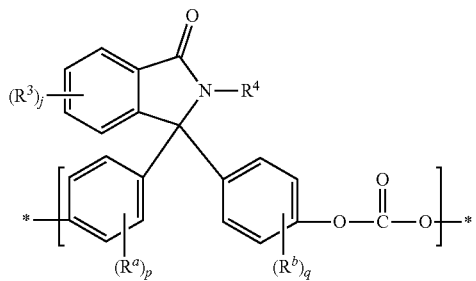

wherein $R^4$ is phenyl, and p, q, and j are each zero;

10 to 45 weight percent of a bisphenol A polycarbonate having a melt volume flow rate of 15 to 150 cubic centimeters per 10 minutes determined according to ASTM D1238-13 at 300° C. and 1.2 kilogram load; and 15 to 25 weight percent of carbon fiber having a diameter of 4 to 100 micrometers;

wherein the composition excludes polycarbonate-polysiloxane copolymers; and wherein the composition exhibits a melt flow rate less than or equal to 20 grams per 10 minutes, determined according to ASTM D-1238-13 at 300° C. and 1.2 kilogram load.

2. An article comprising the composition of claim 1.

3. A method of additive manufacturing, the method comprising:

melt extruding the composition of claim 1 to form a first molten extrusion;

depositing the first molten extrusion in a predetermined pattern to form a first layer comprising an upper surface;

further melt extruding the same composition to form a second molten extrusion; and depositing the second molten extrusion in a predetermined pattern to form a second layer comprising a lower surface in contact with the upper surface of the first layer.

* * * * *